(12) United States Patent
Munkberg et al.

(10) Patent No.: US 8,144,147 B2
(45) Date of Patent: Mar. 27, 2012

(54) HIERARCHICAL BOUNDING OF DISPLACED PARAMETRIC SURFACES

(75) Inventors: Jacob Munkberg, Malmö (SE); Jon Hasselgren, Bunkeflostrand (SE); Robert Toth, Lund (SE); Tomas Akenine-Möller, Lund (SE)

(73) Assignee: Intel Corporation, Santa Clara, CA (US)

( * ) Notice: Subject to any disclaimer, the term of this patent is extended or adjusted under 35 U.S.C. 154(b) by 22 days.

(21) Appl. No.: 12/755,506

(22) Filed: Apr. 7, 2010

(65) Prior Publication Data

US 2011/0248997 A1 Oct. 13, 2011

(51) Int. Cl.
*G06T 15/30* (2011.01)
*G06T 17/20* (2006.01)

(52) U.S. Cl. ........................................ 345/423
(58) Field of Classification Search .................. None
See application file for complete search history.

(56) References Cited

U.S. PATENT DOCUMENTS

| | | | | |
|---|---|---|---|---|
| 6,256,038 | B1 * | 7/2001 | Krishnamurthy | 345/419 |
| 6,429,867 | B1 * | 8/2002 | Deering | 345/423 |
| 7,292,250 | B2 * | 11/2007 | Sepulveda | 345/473 |
| 7,369,691 | B2 * | 5/2008 | Kondo et al. | 382/128 |
| 7,483,024 | B2 * | 1/2009 | Maillot | 345/420 |
| 7,532,213 | B2 * | 5/2009 | Sfarti | 345/423 |

OTHER PUBLICATIONS

Cook, R. L.,Carpenter, L., and Catmull, E. 1987. The Reyes Image Rendering Architecture. In Computer Graphics (Proceedings of ACM SIGGRAPH 87), 96-102.

Fuchs, H., Poulton, J., Eyles, J., Greer, T., Goldfeather, J., Ellsworth, D., Molnar, S., Turk, G., Tebbs, B., and Israel, L. 1989, Pixel-Planes 5: A Heterogeneous Multiprocessor Graphics System Using Processor-Enhanced Memories. SIGGRAPH Comput. Graph. 23, 3, 79-88.
Hasselgren, J., and Akenine-Moller, T. 2007. PCU: The Programmable Culling Unit. ACM Transactions on Graphics, 26, 3, 92.1-92. 10.
Hasselgren, J., Munkberg, J., and Akenine-Moller, T. 2009. Automatic Pre-Tessellation Culling. ACM Transactions on Graphics, 28, 2, 1-10.
Kiciak, P. 2001. Computing normal vector Bezier patches. Comput. Aided Geom. Des. 18, 7, 699-710.
Kovacs, D., Mitchell, J., Drone, S., and Zorin, D. 2009. Real-time Creased Approximate Subdivision Surfaces. In I3D 09: Proceedings of the 2009 Symposium on Interactive 3D Graphics and Games, 155-160.
Loop, C., and Eisenacher, C. 2009. Real-Time Patch-Based Sort-Middle Rendering on Massively Parallel Hardware. Tech. Rep. MSR-TR-2009-83, Microsoft Research.
Loop, C., and Schaefer, S. 2008, Approximating Catmull-Clark Subdivision Surfaces with Bicubic Patches. ACM Trans. Graph. 27, 1, 1-11.

(Continued)

*Primary Examiner* — Said Broome
(74) *Attorney, Agent, or Firm* — Trop, Pruner & Hu, P.C.

(57) ABSTRACT

Hierarchical bounding of displaced parametric surfaces may be a very common use case for tessellation in interactive and real-time rendering. An efficient normal bounding technique may be used, together with min-max mipmap hierarchies and oriented bounding boxes. This provides substantially faster convergence for the bounding volumes of the displaced surface, without tessellating and displacing the surface in some embodiments. This bounding technique can be used for different types of culling, ray tracing, and to sort higher order primitives in tiling architectures.

27 Claims, 7 Drawing Sheets

OTHER PUBLICATIONS

Loop, C., Schaefer, S., Ni, T., and Castano. I. 2009. Approximating Subdivision Surfaces with Gregory Patches for Hardware Tessellation. In SIGGRAPH Asia '09. ACM SIGGRAPH Asia 2009 papers, 1-9.

Makino, K., and Berz, M. 2003. Taylor Models and Other Validated Functional Inclusion Methods. International Journal of Pure and Applied Mathematics, 4, 4, 379-456.

Moore, R. E. 1966. Interval Analysis. Prentice-Hall.

Moule, K., and McCool, M. D. 2002. Efficient Bounded Adaptive Tessellation of Displacement Maps. In Graphics Interface, 171-180.

Myles, A., Ni, T., and Peters, J. 2008. Fast Parallel Construction of Smooth Surfaces from Meshes with Tri/Quad/Pent Facets. In Symposium on Geometry Processing (SGP), xx-xx.

Nataraj, P. S. V., and Kotecha, K. 2002. A New Super Convergent Inclusion Function Form and its Use in Globoal Optimization. In SIAM Workshop on Validated Computing.

Ni, T., Yeo, Y. I., Myles, A., Goel, V., and Peters, J. 2008. GPU Smoothing of Quad Meshes. IEEE International Conference on Shape Modeling and Applications 27, 1, 1-11.

Ni, T., Castano, I., Peters, J., Mitchell, J., Schneider, P., and Verma, V. 2009. Efficient Substitutes for Subdivision Surfaces. In SIGGRAPH '09: ACM SIGGRAPH 2009 Courses, 1-107.

Sederberg T. W., and Meyers, R. J. 1988. Loop detection in surface patch intersections. Comput. Aided Geom. Des. 5, 2, 181-171.

Shirman, L. A., and Abi-Ezzi, S. S. 1993. The Cone of Normals Technique for Fast Processing of Curved Patches. Computer Graphics Forum, 12, 3, 261-272.

\* cited by examiner

HIERARCHICAL BOUNDING OF DISPLACED PARAMETRIC SURFACES

BACKGROUND

This relates generally to graphics processing and, particularly, to tessellation in rendering systems, such as interactive, real time, and off-line/film rendering.

Modern graphics processors contain dedicated hardware for tessellating surfaces into many small triangles. The DirectX 11 application programming interface ("DX11") (API) adds three new stages to the graphics pipeline to support tessellation: the hull shader, the fixed-function tessellator and the domain shader. The hull shader is executed once per patch and once per control point, typically to compute tessellation factors and change control point bases. The fixed-function tessellator takes tessellation factors as inputs and generates a large set of vertex positions in the domain of the input primitive and connectivity information between vertices. The connectivity information forms many small triangles. The domain shader is executed once per generated vertex position from the tessellator. A typical domain shader usage is evaluating the position and normal of a parametric surface, using, for example, a set of control points, barycentric coordinates, and a detailed texture as inputs. The output is a displaced vertex defined by a set of attributes. One attribute is the position, but the shader also can compute the normal/tangent/bi-tangent/texture coordinate/color/transparency or other attribute of the displaced vertex.

DETAILED DESCRIPTION

Reducing the number of domain shader evaluations reduces the computational resources needed for that stage of a graphics pipeline. This can be done by culling patches which do not contribute to the final image. To make this culling efficient, an algorithm for computing hierarchical bounds of displaced surfaces may be used.

Furthermore, in tile-based rendering architectures, bounds for input primitives are needed to efficiently sort the input primitives into tiles. A "bounding volume" is a volumetric object, such as a box or sphere, that encloses another object. Since the domain shader is programmable, it is hard to give conservative and tight bounds of the output positions, which may give rise to a need to sort the generated small triangles individually into tiles. This increases the memory requirements on the tile queues, increases bandwidth usage, and reduces the efficiency of occlusion culling on a patch primitive level.

Figure 7:
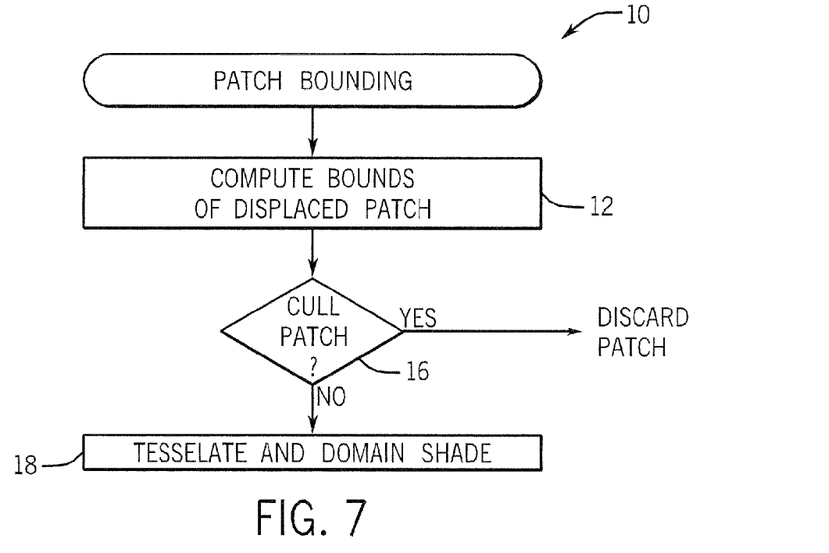
FIG. 7 is a flow chart for bounding of a displaced Bézier surface patch and bounding algorithm in accordance with one embodiment of the present invention.

These bounds may, instead, be computed on the fly (block 12) based on the domain shader only without any need for a user specified parameter, as indicated in FIG. 7. The bounds may then be adaptively refined as the primitive is split into smaller sub-patches to create a hierarchy. In one embodiment, an algorithm enables conservative and tight bounding of dynamic displaced parametric surfaces, such as Bézier patches, using efficient normal bounding, oriented bounding boxes and min-max mipmap hierarchies of the displacement texture. The patch may be culled (block 16). If not, then the primitive may be subjected to tessellation and domain shading (block 18).

Since the patch does not have to be sent to the tessellator, both domain shader and tessellator tasks may be reduced for the patch in some embodiments. If the input patch is culled, then no tessellation and domain shading may be done in some embodiments. Similarly, if a sub-patch is culled, no further processing of that sub-patch may be done in some embodiments. Otherwise, the sub-patch is tessellated and domain shaded.

Collections of bi-cubic Bézier patches are popular rendering primitives for smooth surfaces. Known algorithms may be used for translating Catmull-Clark subdivision surfaces to collections of such parametric patches, while faithfully approximating the limit surface of the recursive subdivision process. It is common to add displacements from high resolution textures in the direction of the normal vector of the patch in order to increase the detail of the final surface.

The Bézier patch with displacement may be used in a domain shader in the rendering API. The Bézier patch is compactly represented by its control points, and this parametric surface representation can be efficiently evaluated in parallel (unlike recursive subdivision surfaces).

A Bézier patch, $p(u,v)$, is a parametric surface, that is, a surface defined over two parametric coordinates, u and v. The term "base patch" denotes the Bézier patch which has not yet been displaced, to distinguish it from the final displaced surface. A domain shader that evaluates a displaced Bézier patch at a parametric coordinate, $(u,v)$, computes the base patch position, $p(u,v)$, the base patch's normalized normal $\hat{n}(u,v)$ and a displacement value (usually) taken from a texture, t(u,v). If the displacement acts in the base patch's normal direction, the domain shader (before multiplication with the model-view-projection matrix) is then:

$$d(u,v)=p(u,v)+\hat{n}(u,v)t(u,v) \quad (1)$$

Multiplying d(u,v) by the model view projection matrix, M, the clip space position, q, in homogeneous coordinates is obtained:

$$q(u,v)=Md(u,v)=M(p(u,v)+\hat{n}(u,v)t(u,v)) \quad (2)$$

The normalized device coordinates are given by $s_x=q_x/q_w$ and $s_y=q_y/q_w$.

A conservative bounds of q(u,v) over a parametric domain, where a<=u<=b and c<=v<=d can be found.

Next, we describe how we bound p(u,v). Bézier patches have the convex hull property and they can be easily bounded by their control points. Finding an axis-aligned bounding box (AABB) for a Bézier patch accounts for 3 min and 3 max operations per control point.

By repeatedly applying Bézier subdivision, the control point cages of the subdivided patches converge quickly towards the underlying base patch. Furthermore, if the original patch is recursively split in two pieces, $p_A$ and $p_B$, in each step, the de Casteljau steps needed to generate $p_A$ will generate the control points for $p_B$ as a side product. This allows for an efficient implementation.

Figure 8:
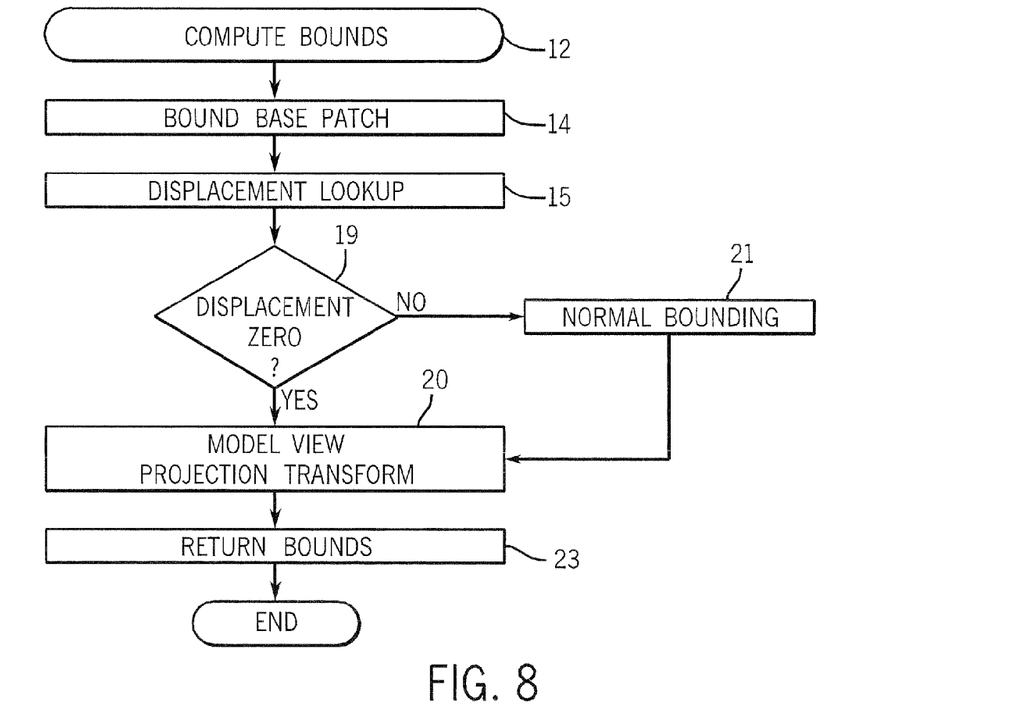
FIG. 8 is a flow chart for a more detailed flow for computing bounds of a displaced patch by finding an OBB for a displaced Bézier patch in accordance with one embodiment.

We can derive axes for an oriented bounding box (OBB) from the control points of the base patch defined axes. This box encloses the base patch more tightly than an AABB. For each of the two subdivided patches in the same iteration both the base patch, the normal patch, and the displacement texture and lookup is refined. Referring to FIG. 8 which shows steps which are used to compute the bounds of the displaced surface indicated in block 12 in FIG. 7, the base patch is subdivided along one axis using Bézier subdivision. The base patch bounding, indicated in block 14, involves finding the OBB axes from control points and projecting all control points on these axes. Then the minimum and maximum along each axis is located to derive an OBB that contains all of the control points, and the convex hull property of Bézier patches means that the surface is contained in this OBB.

Next, as indicated in block 15, the displacement minimum and maximums are looked up in a min/max texture hierarchy. Thereafter, in diamond 19, a check determines whether the displacement is zero. If so, the model view projection is applied to the eight corners of the patch's bounding box (block 20) and the bounds are returned (block 23). If the displacement is not zero, normal bounding is done in block 21 using one of the techniques to be described hereinafter called TPATCH and NPATCH, before doing the model view projection transform (block 20) and returning the bounds (block 23). Finally, in block 23, the model view projection transform is applied.

Figure 1:
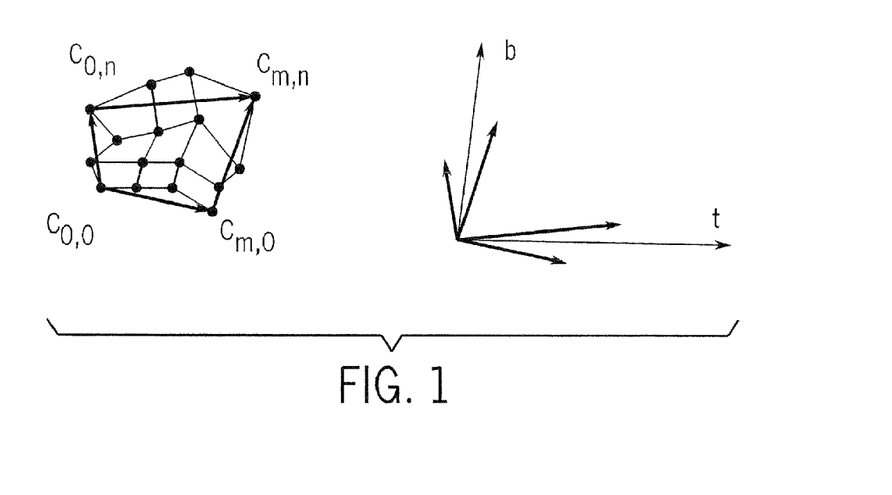
FIG. 1 is a graph showing the corner control points and the vectors b and t; by forming vectors between the corners of the patch, the OBE axes can be derived.
Figure 2:
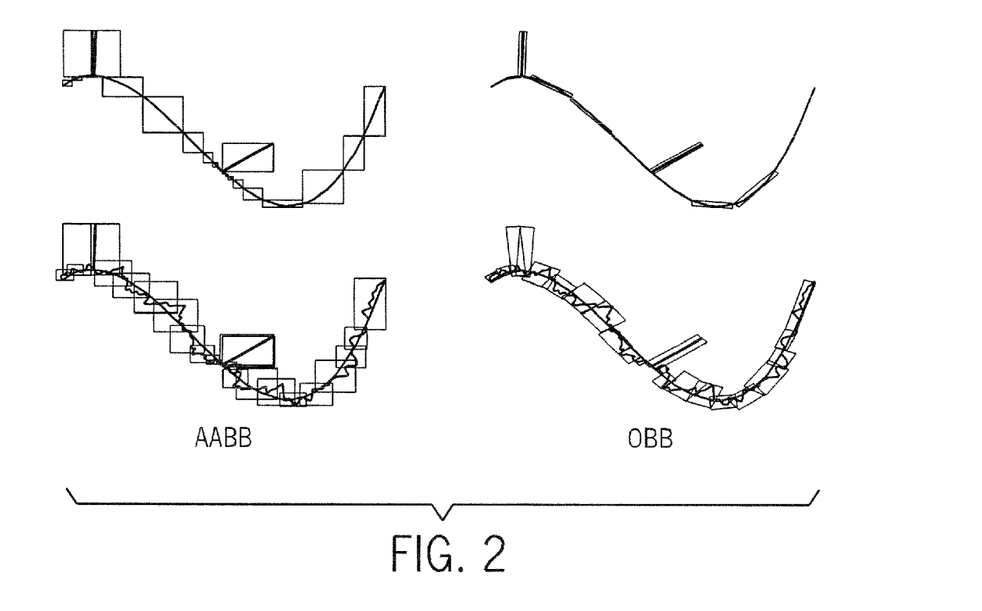
FIG. 2 shows an example of the resulting bounds after 25 steps of bounding a cubic polynomial with two discrete displacement peaks on the upper row, the images on the left using AABBs and the images on the right using OBBs, whose axes are determined by control points of the Bézier curve, while the lower row adds Perlin noise to the displacement shader.
Figure 3:
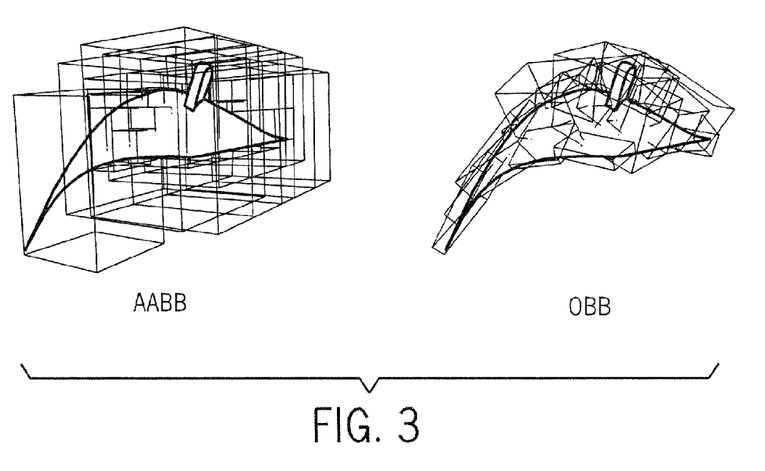
FIG. 3 is a three-dimensional example of AABB versus OBB bounding with the same number of subdivisions.
Figure 9:
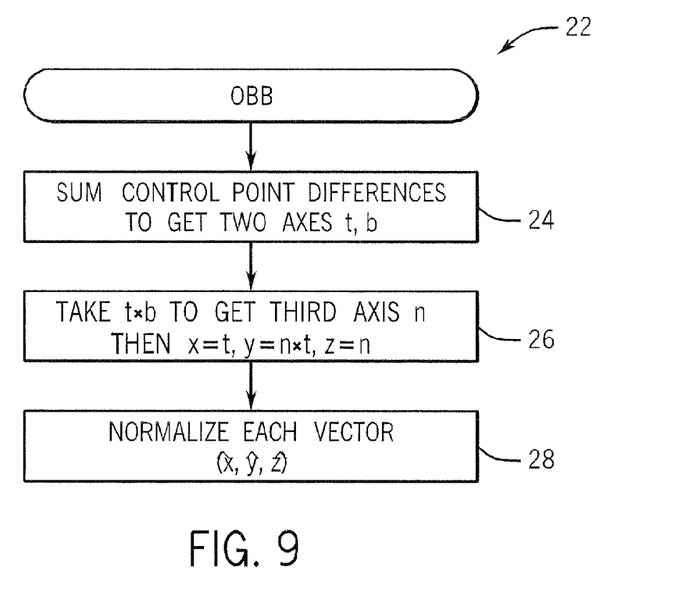
FIG. 9 is a flow chart for one embodiment for defining the OBB for a base patch using control points.

For Bézier patches, the vectors between the corner control points (FIG. 1) are summed to get two axes (FIG. 9, block 24). Given a patch with (m+1)x(n+1) control points, we denote the four corner control points $C_{0,0}$, $c_{m,0}$, $c_{0,n}$ and $c_{m,n}$, and form the two vectors:

$$t=c_{m,0}-c_{0,0}+c_{m,n}-c_{0,n} \quad (3)$$

$$b=c_{0,n}-c_{0,0}+c_{m,n}-c_{m,0} \quad (4)$$

t and b can be seen as approximate average gradients in the u and v parametric directions respectively. They do not have to be orthogonal. Their cross product (FIG. 9, block 26) gives a third axis: n=t cross product of b. To form an orthonormal coordinate system, we set x=t, y=n cross product of t, and z=n and normalize each vector (FIG. 9, block 28). The final coordinate system is: $(\hat{x},\hat{y},\hat{z})$. This significantly reduces the size of the bounding boxes compared to using AABBs in most cases. More elaborate OBB fitting schemes based on the control point cage could be derived, but in practice, the simple approach above produces axes for OBBs that bound the surface tightly. The difference in quality between bounding with AABBs and OBBs is highlighted in FIG. 2 for curves and in FIG. 3 for a Bézier patch. For degenerate cases, we simply use an AABB. As we will show below, the OBB axes are also very useful in the normal bounding algorithms.

Bounding the patch normal, $\hat{n}(u,v)$, over a domain is considerably more difficult than bounding the base position, p(u, v). The normal direction is computed as the cross product of two parametric derivatives of the base patch, p(u,v).

Following standard notation for tensor product Bézier surfaces, a Bézier patch P(u,v): $R^2?R^3$ is defined by:

$$p^{m,n}(u,v) = \sum_{i=0}^{m}\sum_{j=0}^{n} c_{i,j} B_i^m(u) B_j^n(v) \quad (5)$$

where $c_{i,j}$ are the control points, m and n are the degrees of the patch in the parametric coordinates, u an v, respectively. $B_i(u)$ and $B_j(v)$ are Bernstein polynomials.

The partial derivatives can be written as $$\frac{\partial p}{\partial u}(u,v) = \sum_{j=0}^{n}\sum_{i=0}^{m-1} a_{i,j} B_i^{m-1}(u) B_j^n(v) \quad (6)$$

$$\frac{\partial p}{\partial v}(u,v) = \sum_{i=0}^{m}\sum_{j=0}^{n-1} b_{i,j} B_j^{n-1}(v) B_i^m(u) \quad (7)$$

where $$a_{i,j}=m(c_{i+1,j}-c_{i,j}), \quad (8)$$

$$b_{i,j}=n(c_{i,j+1}-c_{i,j}). \quad (9)$$

Note that $a_{i,j}$ and $b_{i,j}$ are (scaled) differences of the control points of the base patch, and therefore vectors. The surface normal (before normalization) is defined by:

$$n(u,v)=(n_x, n_y, n_z) = \frac{\partial p}{\partial u}(u,v) \times \frac{\partial p}{\partial v}(u,v). \quad (10)$$

The normalized normal is given by:

$$\hat{n}(u,v) = \frac{n}{\sqrt{n_x^2+n_y^2+n_z^2}} \quad (11)$$

If the bi-degree of p(u,v) is (m,n) in the parametric coordinates (u,v), then the first order parametric derivatives have degrees (m−1,n) and (m,n−1). As we will see below, the bi-degree of the patch after taking the cross product of the patches is then (m+n−1, m+n−1). A patch representing the normal direction of a bi-cubic Bézier patch thus needs bi-degree (5,5) to be represented exactly.

To apply displacement, we need the normalized normal. The normalization operation (Equation 11) needs bi-degree 2(m+n−1, m+n−1) for an exact representation of the subexpressions: $n_x^2$, $n_y^2$, and $n_z^2$. For a bi-cubic Bézier patch, these terms can be represented exactly as a bi-degree (10,10) Bézier patch. In many cases, this is prohibitively expensive (11·11=121 control points). Finally, the reciprocal square root cannot be represented exactly with Bernstein polynomials. In addition, the operand to the reciprocal square root should always be larger than or equal to zero, since the operand is the squared length of the normal. If this is not true, inf or NaN may result. Therefore the bounded representation of $n_x^2+n_y^2+n_z^2$ should be strictly greater than zero. This seems trivial at a first glance, as the square root of a sum of three squared (real) terms should be greater than or equal to zero. However, this can be difficult in practice as we use the bounding box of the control point cage for bounding, and there is no guarantee that all control points will be positive.

Figure 10:
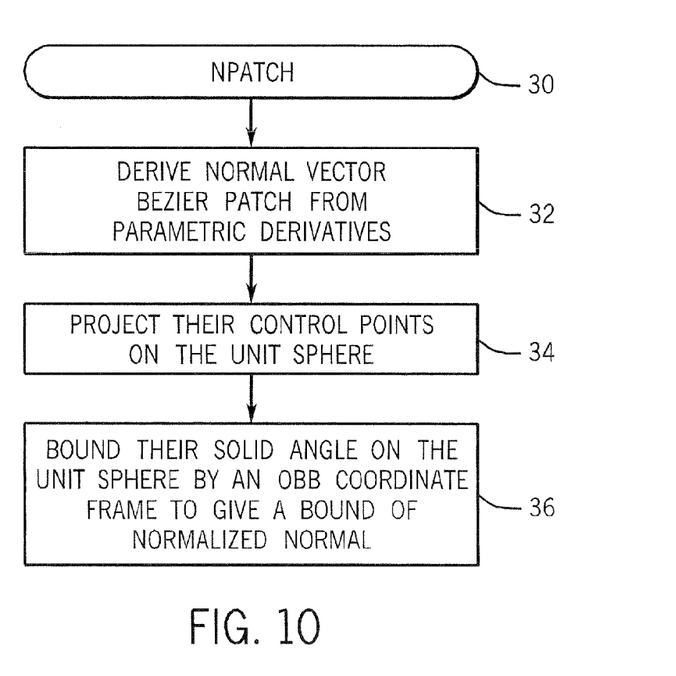
FIG. 10 is a flow chart for one embodiment for finding the normalized normal.

Here, we describe a normal bounding algorithm, which avoids most of the problems discussed above. In summary, normal vector Bézier patch is derived from the parametric derivatives (FIG. 10, block 32), then its control points are projected on the unit sphere (FIG. 10, block 34) and their solid angle on the unit sphere is bounded in an OBB coordinate frame (FIG. 10, block 36), which gives a conservative bound of the normalized normal. We denote this normal bounding approach NPATCH.

Recall that the normal is defined by:

$$n(u, v) = \frac{\partial p}{\partial u}(u, v) \times \frac{\partial p}{\partial v}(u, v) \qquad (12)$$

$$= \sum_{j=0}^{n} \sum_{i=0}^{m-1} a_{i,j} B_i^{m-1}(u) B_j^n(v) \times$$

$$\sum_{k=0}^{m} \sum_{l=0}^{n-1} b_{k,l} B_k^m(u) B_l^{n-1}(v).$$

Using the formula for products of Bernstein polynomials:

$$B_i^m(u) B_j^n(u) = \frac{\binom{m}{i}\binom{n}{j}}{\binom{m+n}{i+j}} B_{i+j}^{m+n}(u) \qquad (13)$$

Equation 12 is written as:

$$\sum_{i,j,k,l} a_{i,j} \times b_{k,l} \frac{\binom{m-1}{i}\binom{m}{k}\binom{n}{j}\binom{n-1}{l}}{\binom{m+n-1}{i+k}\binom{m+n-1}{j+l}} B_{i+k}^{m+n-1}(u) B_{j+l}^{m+n-1}(v). \qquad (14)$$

which is a patch of bi-degree (m+n−1, m+n−1) with control vectors, $v_{p,q}$, given by:

$$v_{p,q} = \sum_{\substack{i+k=p \\ j+l=q}} a_{i,j} \times b_{k,l} \frac{\binom{m-1}{i}\binom{m}{k}\binom{n}{j}\binom{n-1}{l}}{\binom{m+n-1}{i+k}\binom{m+n-1}{j+l}} \qquad (15)$$

To conservatively bound the base patch's normal over the patch, we exploit the fact that the normal after normalization is of unit length. Therefore, we normalize the control vectors, $v_{p,q}$, so that they are represented by points on the unit sphere.

Figure 4:
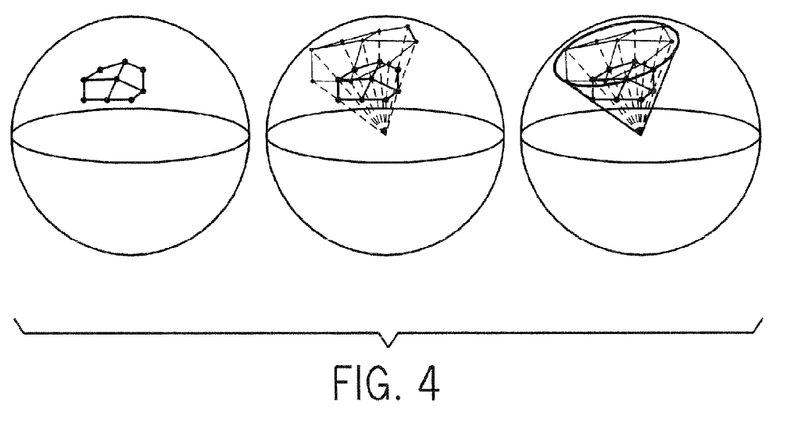
FIG. 4 shows the normal bounding technique for the normal patch with the leftmost figure showing the normal patch before normalization, the middle image showing each control point as normalized so that they map to the unit sphere, and, finally, the rightmost image shows the projections being bounded by a cone which is a conservative bound of the normalized normal for the patch.

A fast way to derive these bounds is to use the i-axis from the OBE coordinate frame, which is an approximation of the patch's normal, and simply compute the minimal scalar product between any normalized control point and the axis. This gives the cosine of the half-angle of a cone enclosing the normalized directions. This is illustrated in FIG. 4.

For a bi-cubic Bézier patch, the computation of $v_{p,q}$ includes 144 cross products. The binomial coefficients can be pre-computed in a small lookup table.

Note, however, that all correlation of which direction corresponds to which parametric coordinate is lost. The tightness of the approach depends on whether the unnormalized normal can be bound reasonably well, which can be hard over large domains, but becomes easier as the subdomain shrinks.

Coarser bounds can be obtained more quickly by forming two tangent cones from the control points of the first order parametric derivative patches $\partial p/\partial u$ and $\partial p/\partial v$ (see Equations 6 and 7). The control points of the derivative patches are normalized and bounded on the unit sphere, (as shown in FIG. 4), forming two cones T:$\{\hat{t},\alpha_t\}$ and B:$\{\hat{b},\alpha_b\}$. A cone, T, is defined by a normalized axis $\hat{t}$ and a half-angle $\alpha_t$.

Figure 5:
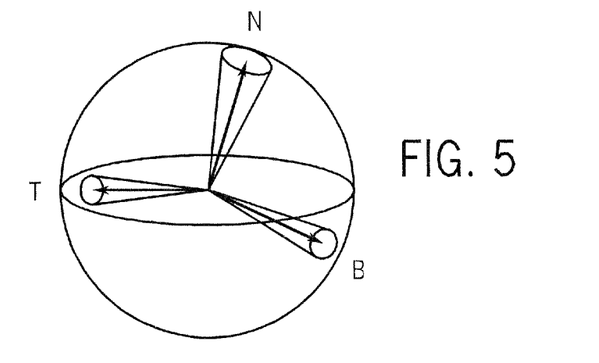
FIG. 5 shows that given bounding cones for the two parametric derivatives denoted by T and B, a cone that bounds the cross product of any vector inside T and any vector inside B can be derived and is denoted here as N.

If the cones T and B do not overlap, a cone N: $(\hat{n},\theta)$ that bounds all possible cross products of two vectors, one from each of T and B can be constructed. Its axis $\hat{n}$ is in the direction $\hat{t} \times \hat{b}$ and its half-angle, $\theta$, is given by:

$$\sin\theta = \frac{\sqrt{\sin^2\alpha_t + 2\sin\alpha_t\sin\alpha_b\cos\beta + \sin^2\alpha_b}}{\sin\beta} \qquad (16)$$

where $\hat{\alpha}$ is the smallest of the two angles between the cone axes parallel to $\hat{t}$ and $\hat{b}$ respectively. The cone, N, bounds all the normalized normal over the patch. The cones T, B, and N are shown in FIG. 5.

Figure 11:
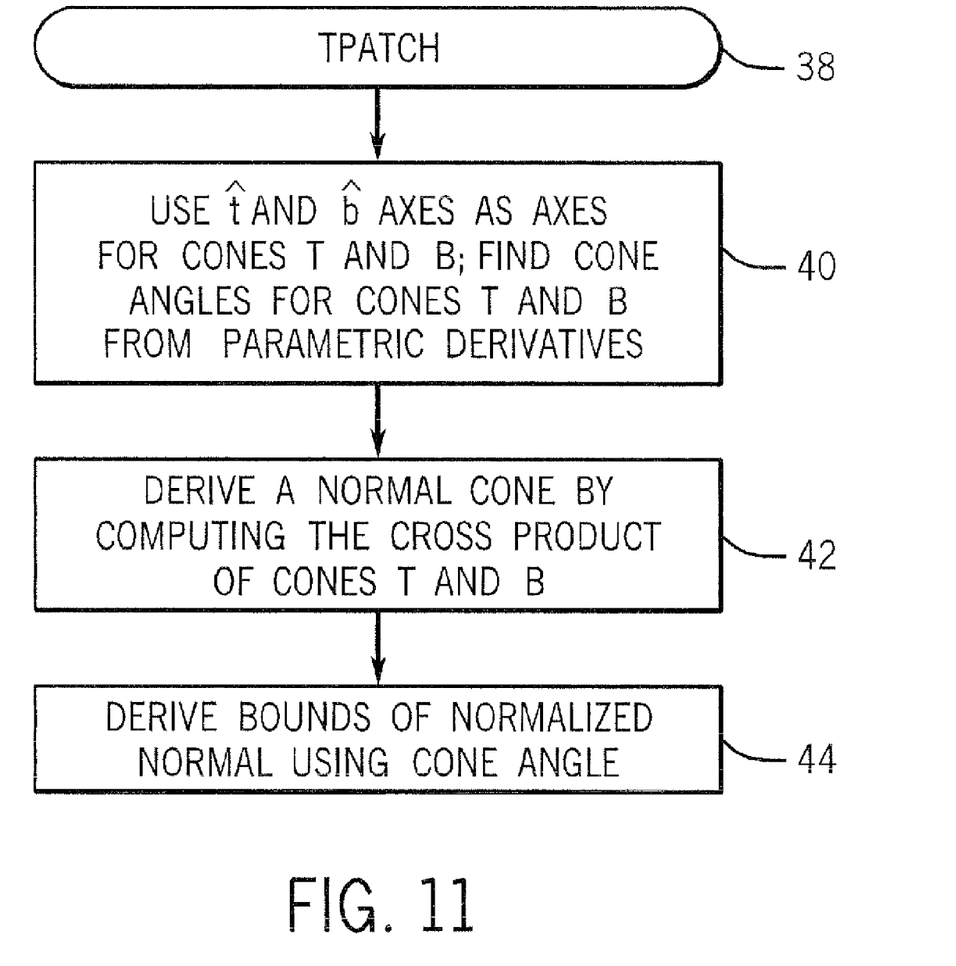
FIG. 11 is a flow chart for another embodiment of finding the normalized normal.

We use the $\hat{t}$ and $\hat{b}$ axes derived above as axes for the cones T and B and the cone angles are found for cones T and B from the parametric derivative patches' control points (FIG. 11, block 40). The cosine of the cone angle $\acute{a}_t$ ($\acute{a}_b$) is simply the minimum dot product of any normalized control point from the tangent patch with the $\hat{t}$ ($\hat{b}$) axis. A normal cone is derived by computing the cross product of cones T and B (FIG. 11, block 42). The bounds for the normalized normal expressed in the OBB coordinate frame are:

$$([-\sin\theta, \sin\theta],[-\sin\theta, \sin\theta],[\cos\theta,1]) \qquad (17)$$

where θ is the cone half angle of the normal cone N. Using the equality $\sin^2 \grave{e} + \cos^2 \grave{e} = 1$, we can derive the bounds of the normalized normal using the normal cone angle without using any trigonometric functions (FIG. 11, block 44). We denote this approach TPATCH.

Care must be taken to check that the two tangent cones do not overlap. The cones overlap if $\acute{a}_t + \acute{a}_b > \hat{a}$, which given $\alpha_t$<pi, $\alpha_b$<pi, and, β<pi can be rewritten as:

$$\cos\alpha_t \cos\alpha_b - \sin\alpha_t \sin\alpha_b < \cos\beta \qquad (18)$$

If this condition is true, or if $\cos\acute{a}_t$<0, $\cos\acute{a}_b$<0, we return the unit box in the OBB coordinate frame. A unit box has the following two extreme vertices: (−1,−1,−1) and (+1,+1,+1). However, this will rarely happen, except for highly curved patches, since the OBB coordinate frame is computed from an approximation of the local surface tangent, bi-normal, and normal of the base patch.

Techniques for bounding texture lookups involve keeping two extra mipmap hierarchies. The first stores the maximum displacement value over each texture footprint and level and the second stores the minimum displacement value of the footprint. In general, when the parametric interval decreases, so do the texture bounds.

The final bounds of the displacement vector, o=n̂t, is the product (on interval arithmetic form) of the interval from the texture lookup [$t_{min}, t_{max}$] times the intervals of the normalized normal vector along each axis. Using the notation [a,ā] to define an interval, where, a is the lower limit and ā is the upper limit, multiplication of two intervals is defined by:

$$[a,\bar{a}] \otimes [b,\bar{b}] = [\min(a\underline{b}, a\bar{b}, \bar{a}\underline{b}, \bar{a}\bar{b}), \max(a\underline{b}, a\bar{b}, \bar{a}\underline{b}, \bar{a}\bar{b})] \quad (19)$$

Hence, the interval version of the x-component of o, is:

$$[\underline{o}_x, \bar{o}_x] = [\underline{t}, \bar{t}] \otimes [\hat{n}_x, \bar{\hat{n}}_x] \quad (20)$$

and similarly for the other components. If the texture displacement is strictly positive, then equation 20 can be further optimized.

The last step in most domain shaders is the matrix transformation to clip space, so the remaining part in obtaining bounds for q is the model view projection matrix, which does not depend on the parametric domain, and can be seen as a constant. This constant matrix is easily multiplied with the eight corners of the OBB obtained from the displaced patch d, resulting in bounds for the clip space position q. (The last step may not be needed when using hierarchical bounds for pre-tessellation sorting and ray tracing).

Given an initial coarse subdivision of the patch, a priority queue of the bounding boxes of the subdomains may be maintained in some embodiments. (For example, each sub-patch could alternatively be divided into a number of smaller sub-patches until each sub-patch is "small enough," in terms of volume, surface area, or projected area, as examples). In each following subdivision step, we take the top element of the queue, subdivide it further, and insert the subdivided boxes back into the queue.

Figure 6:
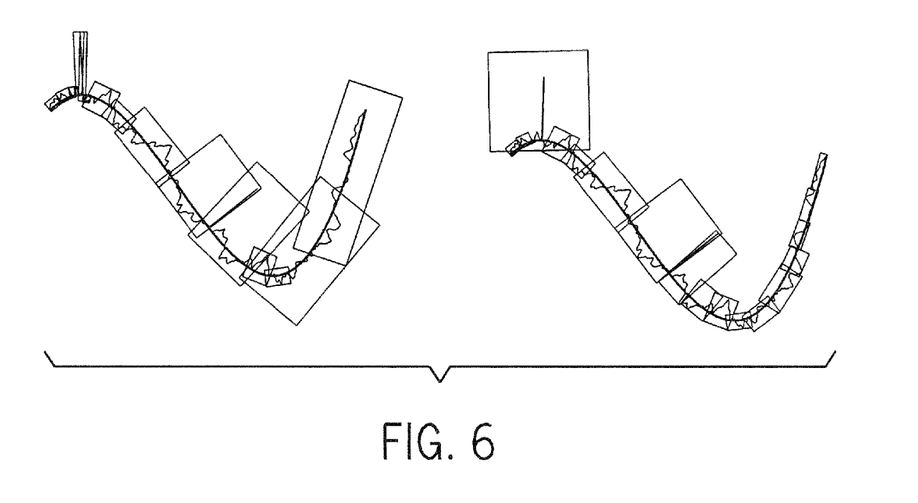
FIG. 6 shows an example of two different views using a screen space bounding box size as the sorting criteria with 16 steps of subdivision being performed, and the resulting difference in subdivision density.

The exact sorting criterion is application dependent, and may contain the screen-space extents of the bounding box, the depth values, or prioritize boxes intersecting a frustum plane for view frustum culling. FIG. 6 illustrates a view-dependent subdivision criterion.

For view frustum culling, the OBB corners (in clip-space) are tested against the frustum planes. The subdivision criterion may be designed so that sub-patches straddling the camera frustum are prioritized, which efficiently culls geometry outside the clip planes. The clip test results of the patch can also be used to guarantee that the entire patch is completely inside the view frustum, so the clip tests for generated triangles from the patch can possibly be bypassed.

Given a coarse depth buffer, subpatches can be culled if their bounding box is entirely occluded by already drawn primitives. The subdivision criterion may be adopted so that sub-patches closer to the camera are processed first and sent to the rasterization stage of the pipeline, therefore increasing the likelihood of z-culling.

Backface culling is the hardest type of culling, due to the difficulty in efficiently bounding the geometric normal after displacement. However, given the tessellation rate, the normal bounds and a tight interval of the displacement, bounds for the displaced surface normal can be derived. Further, the subdivision criterion can be adapted to target patches with high normal variation, increasing the likelihood of backface-culling of subpatches.

After computing a bounded representation of the displaced Bézier patch, we can use the bounds for pre-tessellation sorting into tiles. Tile-overlap can be reduced by hierarchical subdivision of the largest screen-space bounding box.

In a ray tracing environment, the subdivision criterion is tuned to reduce the total surface area of each OBB, similar to how a surface area heuristic builds acceleration data structures. In collision detection, the subdivision criterion for reduced OBB volumes is tuned.

Hierarchical bounding volumes can be used for culling, as well as for sorting into tiles and ray tracing. Using the techniques described herein, electronic data may be transformed to a visual form for display on a display.

To efficiently support the DX-11 tessellation pipeline stages, in a tiling architecture, the bounds of the displaced surfaces are needed before tessellation and domain shading occurs. These bounds can be used to bin (i.e. sort primitives into tile-specific queues) the displaced Bézier patches without doing any tessellation. The tessellation and domain shading would then occur when and if needed. The use of hierarchical bounds may be useful for binning, view frustum culling, occlusion culling, and backface culling.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

Figure 12:
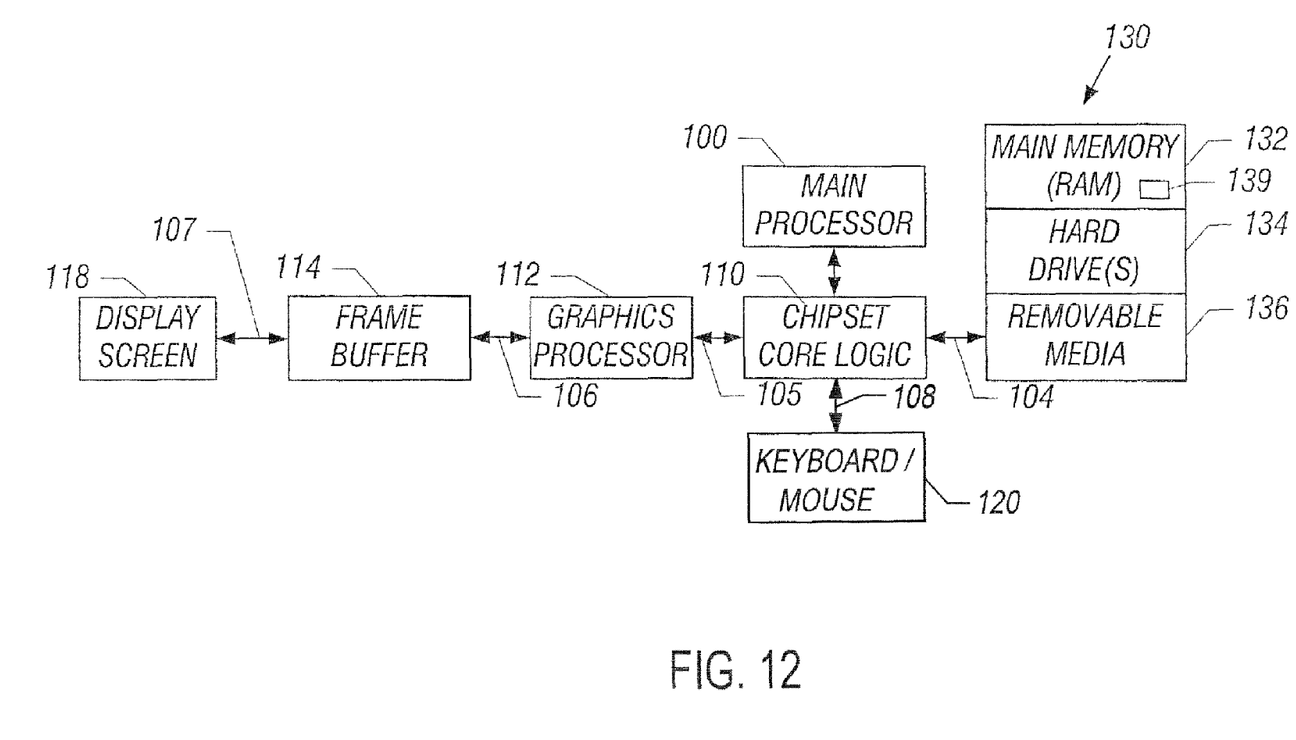
FIG. 12 is a hardware depiction for one embodiment of the present invention.

The computer system 130, shown in FIG. 12, may include a hard drive 134 and a removable medium 136, coupled by a bus 104 to a chipset core logic 110. A keyboard and mouse 120, or other conventional components, may be coupled to the chipset core logic via bus 108. The core logic may couple to the graphics processor 112, via a bus 105, and the main or host processor 100 in one embodiment. The graphics processor 112 may also be coupled by a bus 106 to a frame buffer 114. The frame buffer 114 may be coupled by a bus 107 to a display screen 118. In one embodiment, a graphics processor 112 may be a multi-threaded, multi-core parallel processor using single instruction multiple data (SIMD) architecture.

In the case of a software implementation, the pertinent code may be stored in any suitable semiconductor, magnetic, or optical memory, including the main memory 132 or any available memory within the graphics processor. Thus, in one embodiment, the code to perform the sequences of FIGS. 7-11 may be stored in a machine or computer readable medium, such as the memory 132 or the graphics processor 112, and may be executed by the processor 100 or the graphics processor 112 in one embodiment.

FIGS. 8-12 are flow charts. In some embodiments, the sequences depicted in these flow charts may be implemented in hardware, software, or firmware. In a software embodiment, a computer readable medium, such as a semiconductor memory, a magnetic memory, or an optical memory may be used to store instructions and may be executed by a processor to implement the sequences shown in one or more of the flow charts depicted in FIGS. 8-13.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   using a computer processor to average vectors between corner control points to get two axes;
   taking the cross product of the two axes using the computer processor; and
   normalizing each vector to form an object-oriented bounding box coordinate frame.

2. The method of claim 1 including computing hierarchical bounds of the displaced parametric surface.

3. The method of claim 2 including adaptively refining bounds as the parametric surface is split into smaller sub-patches by an application-defined priority metric.

4. The method of claim 3 wherein bounding includes refining position, normal and texture bounds.

5. The method of claim 4 including repeatedly applying Bézier subdivision until an application-defined threshold is met.

6. The method of claim 1 including deriving a normal vector Bézier patch from parametric derivatives, projecting control points on a unit sphere, and bounding a solid angle on a unit sphere in an object oriented bounding box coordinate frame to give a bound of the base patch's normalized normal over the patch.

7. The method of claim 1 including using cones for deriving bounds of normalized normals of a base patch.

8. The method of claim 1 including forming a first cone from a derivative in one parametric direction, forming a second cone from a derivative in a different parametric direction, and forming a third cone by computing a cross product of the first and second cones in the coordinate frame.

9. The method of claim 1 including culling sub-patches, tessellation, and domain shading.

10. The method of claim 1 including using bounds to sort higher order primitives into screen-space tiles.

11. The method of claim 1 including building a hierarchy of bounding volumes for ray tracing.

12. The method of claim 1 including transforming said surface to a visual form displayed on a computer display.

13. A non-transitory computer readable medium storing instructions executed by a computer to:
    average vectors between corner control points to get two axes;
    take the cross product of the two axes; and
    normalize each vector to form an object-oriented hounding box coordinate frame.

14. The medium of claim 13 further storing instructions to compute hierarchical bounds of the displaced parametric surface.

15. The medium of claim 14 further storing instructions to adaptive refine bounds as the parametric surface is split into smaller sub-patches.

16. The medium of claim 15 further storing instructions to refine the position, normal and texture bounds during bounding.

17. The medium of claim 16 further storing instructions to repeatedly apply Bézier subdivision until application defined threshold is met.

18. The medium of claim 13 further storing instructions to derive a normal vector Bézier patch from parametric derivatives, project control points on a unit sphere, and bound the solid angle of the unit's sphere in an object oriented bounding box coordinate frame to give a bound of the base patch's normalized normal over the patch.

19. The medium of claim 17 further storing instructions to form a first cone from a derivative in one parametric direction, form a second cone from a derivative in a different parametric direction, and form a third cone by computing a cross product of the first and second cones in the coordinate frame.

20. The medium of claim 13 further storing instructions to cull sub-patches, tessellation and domain shading.

21. The medium of claim 13 further storing instructions to build a hierarchy of bounding volumes for ray tracing.

22. An apparatus comprising:
    a processor;
    a storage coupled to said processor to bound a parametric surface using a coordinate frame derived from the parametric surface and to bound a displacement vector in the same coordinate frame; and
    average vectors between corner control points to get two axes, take the cross product of the two axes, and normalize each vector to form an object-oriented bounding box coordinate frame.

23. The apparatus of claim 22 including a display to display an image resulting from the bounding of the parametric surface.

24. The apparatus of claim 22, said storage to store instructions to compute hierarchical bounds of the displaced parametric surface.

25. The apparatus of claim 24, said storage to store instructions to adaptively refine bounds as the parametric surface is split into smaller sub-patches by an application-defined priority metric.

26. The apparatus of claim 24, said storage storing instructions to refine positive, normal and texture bounds.

27. The apparatus of claim 26, said storage storing instructions to repeatedly apply Bézier subdivision until an application-defined threshold is met.

* * * * *

UNITED STATES PATENT AND TRADEMARK OFFICE
CERTIFICATE OF CORRECTION

| | | |
|---|---|---|
| PATENT NO. | : 8,144,147 B2 | Page 1 of 1 |
| APPLICATION NO. | : 12/755506 | |
| DATED | : April 3, 2012 | |
| INVENTOR(S) | : Munkberg et al. | |

It is certified that error appears in the above-identified patent and that said Letters Patent is hereby corrected as shown below:

Column 9:
Line 49, "hounding" should be --bounding--;

Column 10:
Line 40, "displaced" should be deleted.

Signed and Sealed this
Twenty-ninth Day of May, 2012

David J. Kappos
*Director of the United States Patent and Trademark Office*